Jan. 26, 1960 | G. HAUGK | 2,922,987
INFORMATION STORAGE SYSTEM
Filed Aug. 5, 1957
FIG. 1
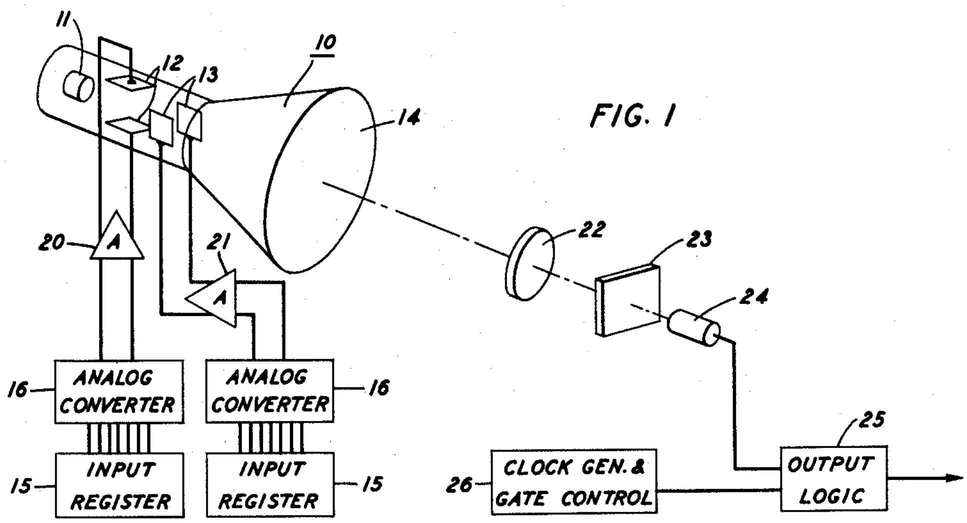
FIG. 2
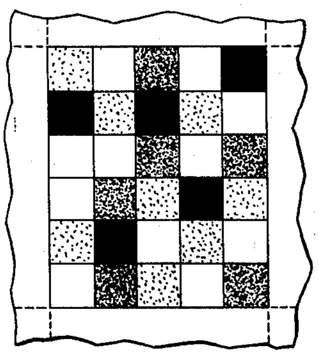
FIG. 3
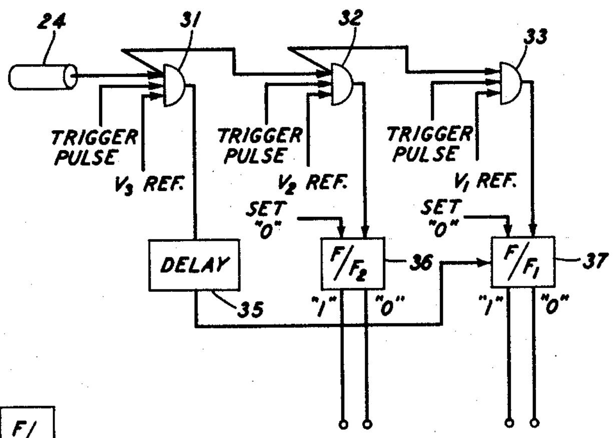
FIG. 4
| CODE VALUE | GATES 31 $>V_3$ | 32 $>V_2$ | 33 $>V_1$ | F/$F_2$ | F/$F_1$ |
|---|---|---|---|---|---|
| 0 | 0 | 0 | 0 | 0 | 0 |
| 1 | 0 | 0 | 1 | 0 | 1 |
| 2 | 0 | 1 | 1 | 1 | 1 |
| 3 | 1 | 1 | 1 | 1 | 0 |
INVENTOR
G. HAUGK
BY [signature]
ATTORNEY 2,922,987

INFORMATION STORAGE SYSTEM

George Haugk, Succasunna, N.J., assignor to Bell Telephone Laboratories, Incorporated, New York, N.Y., a corporation of New York Application August 5, 1957, Serial No. 676,172

12 Claims. (Cl. 340—173)

This invention relates to information storage systems and more particularly to such systems especially suitable for relatively permanent storage of large quantities of information.

One type of rapid access memory in which stored information requires change at relatively infrequent intervals and which utilizes electron discharge devices is known as the flying spot store. Such a system is disclosed in R. C. Davis and R. E. Staehler patent application Serial No. 541,195, filed October 18, 1955, now Patent No. 2,830,285, issued April 8, 1958.

In a flying spot storage system, a concentrated electron beam is projected from an electron gun of a cathode ray tube against the inner face of a luminescent screen or target thereof. An input signal deflects the electron beam to a particular discrete area of the screen. Light emanating from the spot produced by the beam impinging the discrete area of the screen is focused by a suitable lens system upon a discrete area of a storage surface. Each discrete area on the storage surface possesses peculiar light transmission characteristics such that a photosensitive device, positioned to receive light passing through the storage surface, will react to provide electrical output signals corresponding to the information contained in the area of light impingement on the storage slide. The electron beam and thus the consequent light beam, are deflected in two coordinate directions; for example, they may be repeatedly swept in one direction and selectively deflected in the other direction, or they may be deflected to a particular spot on the storage surface if completely random access is desired. The information is stored by a photographic process as opaque and nonopaque areas on the storage slide. Light passing through a nonopaque area represents one information condition and is indicated by an output signal from the photosensitive device, while light striking an opaque area of the slide fails to reach the photosensitive device, and lack of an output signal at this time indicates another information condition.

The number of completely separate bits of information that can be represented on the storage slides in such a system is limited by the spot size and shape. The number is increased by splitting the beam and focusing it through a multiple lens system simultaneously on a plurality of storage slides. The number can be increased further by deflecting the electron beam through wider angles so that the light beam traverses a greater area on the target surface. There are practical limits, however, to the width of the angle that can be employed. At first it might appear that a greater number of distinct bits of information could be represented by a larger tube. Unfortunately, however, the spot size of the cathode ray beam tends to increase as the size of the tube increases, the consequent light beam increasing in size a corresponding amount. Also, the wider optical angles reduce the ability of the optical system to resolve the spots.

Additionally, information in such a system is stored in binary number representations, each discrete area representing a "zero" or "one" condition or "on" or "off" condition as the two binary code conditions are frequently described. Thus each such storage area can provide only one of two output conditions, and a plurality of such storage areas is required to supply the necessary binary digits or bits of information to form a binary code number or "word." For example, to read the number five from a storage system of this type in which the storage slides are prepared to incorporate the conventional binary number code, the light beam must pass through three discrete storage areas of respectively nonopaque, opaque and nonopaque conditions to provide output signals from the associated photosensitive device representing the binary digits 101, the binary number corresponding to the decimal number 5.

The physical size and discrete area storage capacity described in the above paragraphs confine the system capacity to limits too narrow for many applications. It therefore becomes necessary to operate a plurality of tubes concurrently or consecutively to increase system capacity, or alternatively, in accordance with this invention, to increase the information bearing capacity of each discrete area of the storage medium.

It is an object of this invention to provide an improved beam storage system.

It is another object of this invention to improve the operation of beam storage systems and particularly to increase the storage capacity of the system.

These and other objects of this invention are attained in one specific embodiment thereof, wherein the information storage slide or slides comprise discrete areas of different light transmission characteristics. A photosensitive device is positioned to receive light transmitted through a discrete area of the information storage slide and in response to the received light forms an electrical signal which is transmitted to output logic circuitry. The latter circuitry, in turn, compares the received electrical signal with various reference level signals and provides a plurality of comparison resultant signals in parallel form in the output indicative of a binary number. Thus, for example, a discrete area of the information storage slide may be processed so as to be opaque or transparent to the incident light or so as to pass any one of a plurality of intermediate light levels through various levels of translucence or shades of gray.

Each gray level possesses a distinct light transmission characteristic which may be detected by the photosensitive device receiving light through the information storage slide. The photosensitive device in turn provides distinct output signals corresponding to opaque, transparent and the various gray levels of the information storage slide. Each of a plurality of comparison logic devices receives the output signal, compares it to a distinct reference signal and provides a resultant signal if the output signal is greater than the reference signal. The comparison resultant signals from the plurality of logic devices may advantageously be inserted in an output register in parallel form to provide a series of binary digits which may then be transmitted to an output circuit in parallel or serial form.

It is a feature of this invention that information be stored on discrete areas of the information storage slide so as to provide distinct light transmission characteristics. It is a more particular feature of this invention that the discrete storage areas be processed to be transparent or opaque or to permit passage of light through various gray levels intermediate transparent and opaque.

It is another feature of this invention that a plurality of logic devices each receive an electrical signal derived from light passing through a discrete area of the information storage slide and compare it to distinct reference signals to provide a plurality of output signals, forming a number in parallel binary code form.

A complete understanding of this invention and of these and various other features thereof may be gained from consideration of the following detailed description and the accompanying drawing, in which:

Fig. 1 is a diagrammatic representation of one specific illustrative embodiment of this invention;

Fig. 2 is a diagram of a portion of the storage slide employed in one specific embodiment of this invention drawn to a larger scale than that used in Fig. 1 to illustrate the arrangement of discrete information bearing areas on the storage slide;

Fig. 3 is a schematic representation of output logic circuitry for use in the illustrative embodiment of Fig. 1; and Fig. 4 is a chart illustrating the possible output information to be derived from the three positions of logic circuitry of Fig. 3 utilizing a three digit input code; i.e., a storage slide having three distinct levels of translucence.

Refering now to the drawing, Fig. 1 depicts an illustrative embodiment of this invention utilizing a cathode ray tube 10. As known in the art, the tube 10 may advantageously comprise within an evacuated envelope, such as glass, an electron gun shown generally at 11. The electron gun produces a concentrated electron beam which is projected centrally between two pairs of deflection plates 12 and 13 mounted in space quadrature. The electron beam is projected against a target surface 14 which forms the face of the cathode ray tube and is coated with a luminescent material or phosphor. The deflection plates 12 and 13, which are energized from vertical and horizontal deflection circuits through deflection amplifiers 20 and 21, respectively, serve to deflect the electron beam to a desired discrete area of surface 14. The horizontal deflection circuitry advantageously is identical to the circuitry for vertical deflection so that a description of the horizontal circuitry will suffice to describe the structure and operation of this specific embodiment of this invention.

Binary information is fed into an input register 15 indicating a particular address or start location of information to be read out of the system. The input information for address location in each coordinate may consist of any suitable number of binary digits sufficient to locate the desired discrete storage area. Thus the input register 15 and its associated analog converter 16 may be of any of a number of circuits known in the art which are capable of generating analog representations on application thereto of simultaneous input pulses; for example, input register 15 may comprise a series of bistable flipflop units arranged to feed simultaneously through diodes of analog converter 16, thereby passing analog stepped amounts of current to amplifiers 20 and 21 in the respective coordinate deflection circuits. Amplifiers 20 and 21 supply output voltages to the deflection plates 12 and 13 representing a summation of analog values in each deflection circuit.

The electron beam is deflected in accordance with the voltages applied to the deflection plates 12 and 13 so that it impinges a discrete area of the surface 14 and produces a spot of light thereat. A lens system comprising individual lenses such as 22 is positioned behind surface 14 to focus the resultant light on information storage slides such as slide 23. A plurality of slides such as 23 may be utilized so long as arranged consistent with output connections from pickup means associated with each slide.

Fig. 2 is a fragmentary view showing the construction of the information storage slide which may advantageously be employed in embodiments of this invention. A coating of a suitable photoemulsion is applied to a transparent base, such as a glass plate, and patterns of different density areas are formed in the emulsion in accordance with information which it is desired to store in the system. An example of a binary word which may be stored in the information storage slide 23 is shown in Fig. 2, considerably enlarged from actual size. Each discrete area may be processed to present any one of a plurality of different light transmission characteristics including transparent, opaque and various intermediate density levels in the photographic emulsion, or gray levels, capable of transmitting different levels of light. The top row of discrete areas in Fig. 2, for example, portrays four different light transmission characteristics; namely, two distinct gray level areas, transparent and opaque.

As explained further hereinafter, each discrete area represents a number of bits or binary digits of the stored binary number or word. Increasing the number of intermediate gray levels employed on the discrete information areas will increase the bit storage potential of each discrete area and thus the storage capacity of the system.

Utilizing two intermediate gray levels plus opaque and transparent, the thirty discrete areas of the storage slide illustrated in Fig. 2 are capable of storing sixty bits or binary digits or two bits in each discrete area. Storing two bits per discrete area permits an output in binary code form of any one of $2^2$ or four, two digit, binary code numbers from each discrete area. It may be appreciated that combinations of the outputs from several discrete areas in parallel form vastly increase the binary number output possibilities. For example, the combined output of three discrete areas or six bits permits readout of any one of 64 binary code numbers.

Light passing through the slide 23, Fig. 1, impinges a photosensitive device 24 causing an electrical signal to be passed to output logic circuitry. A feedback positioning circuit (not shown), described in the patent of Davis and Staehler cited hereinbefore, may be utilized to assure accurate positioning of the beam at the desired discrete area of the slide 23. Clock generator and gate control 26 will transmit gating pulses to the output logic upon assurance of exact beam positioning and the output information read out.

Fig. 3 illustrates one form of output logic suitable for receiving the four level information from the storage slide described in connection with Fig. 1. The logic circuitry comprises three coincidence or AND gates 31, 32 and 33, delay means 35 and flipflop circuits 36 and 37. The AND gates 31, 32 and 33 are connected to receive simultaneously the output of photosensitive device 24. Each of the AND gates is placed at a distinct reference voltage level $V_3$, $V_2$, $V_1$, so that upon receipt of a clock or trigger pulse, delivered simultaneously to each AND gate, a gate will operate and provide an output signal if the output of device 24 provides a voltage at a level greater than the reference voltage applied to the gate. The reference voltage levels are set in accordance with the signal strength derived from passage of light through the four light transmission levels of the information storage slide 23.

Thus, as indicated in Fig. 4, a discrete area of the slide 23 having a zero value encoded therein will be opaque and will result in a zero voltage signal to the AND gates 31, 32 and 33. As all reference voltage levels on the respective gates are greater than zero, the final outputs from each of flipflop circuits 36 and 37 will be zero. The signal produced by the intermediate gray level closest to opaque will be greater than the reference voltage applied to AND gate 33 but less than the reference voltage applied to AND gate 31 or AND gate 32. AND gate 33 alone will provide an output signal which will cause flipflop 37 to provide an output one while flipflop 36 again provides an output zero. The combination, 01, represents the number one in binary code. Upon detection of the final output signals the flipflops 36 and 37 are placed in the zero condition by reset pulses from the clock generator and gate control 26. The intermediate gray level closest to transparent permits a signal voltage greater than $V_2$ and $V_1$, so that each flipflop provides an output one, corresponding in parallel to the number two in reflected binary code form. A transparent discrete area, in turn, permits signal voltage greater than all reference levels. The three AND gates provide outputs, the output of gate 31 being delayed in delay 35 and applied to flipflop 37 after it has received the output of gate 33. The final output of flipflop 37 thus is a zero and that of flipflop 36 a one. The combination 10 in the final output is the number 3 in reflected binary code form.

It is apparent that various combinations of logic components may be employed to derive various output code combinations as desired. The output may be in conventional binary, reflected binary, as illustrated, or any other known binary code form. Similarly, arrangements may be devised to present the output information in code forms other than binary.

Information may be read from more than one discrete area in consecutive order to produce binary numbers of a higher order. Thus a six digit number may be produced from the consecutive output of three discrete storage areas, etc. The same result is attained by simultaneous readout from plural storage slides and gating of the result signals in proper order into the output register. In addition the capacity of a single discrete storage area may be increased by an increase in the number of possible light transmission characteristics and a corresponding increase in the number of output logic circuits. The circuitry and arrangements for accurately positioning the light beam on discrete areas of the storage slide and assuring readout of the desired information may be of the type disclosed in the aforementioned Davis and Staehler patent application.

It is to be understood that the above-described arrangements are illustrative of the application of the principles of the invention. Numerous other arrangements may be devised by those skilled in the art without departing from the spirit and scope of the invention.

What is claimed is:

1. A storage system comprising an electron discharge device including a luminescent surface, electron gun means for projecting an electron beam against said surface and means for deflecting said beam to particular spots on said surface, an information storage member positioned adjacent said surface to receive light therefrom, said member having binary information stored on selected transparent, opaque and at least one intermediate gray level discrete areas providing a plurality of different light transmission characteristics, a light sensitive device positioned to receive light from said luminescent surface through said information storage member, said light sensitive device responsive to receipt of light thereat to generate an electrical signal, a plurality of output devices each connected to said light sensitive device, means applying distinct reference signals to each of said output devices, and means for triggering said output devices to provide an output signal from each of said output devices receiving one of said electrical signals greater than said applied reference signal.

2. A storage system in accordance with claim 1 wherein each of said output devices comprises a coincidence logic comparison circuit.

3. A storage system in accordance with claim 2 and further comprising output registering means connected to said output devices.

4. A storage system comprising a cathode ray tube including a luminescent surface, means for projecting an electron beam against said surface to produce a spot of light on the area of incidence, and means for deflecting said electron beam, an information storage member, optical means for focusing the light from said area of incidence upon said information storage member, said member having binary information stored at various discrete areas thereof as a selected one of more than two levels of translucence, light responsive means for generating a single electrical manifestation of the light transmitted thereto through a selected one of said discrete areas, a plurality of devices connected to said light responsive means so as to receive said electrical manifestation simultaneously, and means connected to said devices for determining the operation of said devices dependent on the level of translucence of said selected discrete area.

5. A storage system in accordance with claim 4 and further comprising conversion means connected to said plurality of devices for providing digital output signals.

6. A storage system comprising a cathode ray tube including a luminescent surface, means for projecting an electron beam against said surface to produce a spot of light on the area of incidence, and means for deflecting said electron beam, an information storage member having binary information stored thereon in the form of opaque, transparent and intermediate translucent areas, a plurality of coincidence logic gates, a single light sensitive device positioned to receive light from said luminescent surface through said information storage member, said light sensitive device responsive to receipt of light thereat to apply an electrical signal simultaneously to said logic gates, means applying a distinct reference voltage to each of said logic gates, means for applying a trigger pulse to said logic gates, and an output register connected to said logic gates for registering signals from said logic gates responsive to the simultaneous application of said trigger pulse and said electrical signal above the level of said reference voltage.

7. A storage system comprising an electron discharge device including a luminescent surface, means for projecting an electron beam against said surface, and means for deflecting said electron beam, an information storage member having binary digits stored on each of a plurality of discrete areas arranged to transmit a selected one of $n$ quantities of incident light therethrough, a single light responsive device arranged to receive light from said luminescent member through said information storage member, said light responsive device generating a single electrical manifestation of the light received thereat, and a plurality of output means connected to said light responsive device comprising $n-1$ AND logic gates connected in parallel to the output of said light sensitive device and means for establishing the operating level of each of said gates above a discrete threshold signal level, said gates responsive to the simultaneous receipt thereat of said electrical manifestation to produce one of $n$ binary numbers of $m$ digits each.

8. A storage system in accordance with claim 7 wherein said output means further comprises a trigger pulse source connected to each of said gates, said gates being operative in response to concurrent receipt of said trigger pulse and said electrical manifestation above said discrete threshold signal level.

9. A storage system in accordance with claim 7 wherein said output means further comprises $m$ flipflop circuits, each connected to the output of at least one of said AND logic gates.

10. A storage system in accordance with claim 9 wherein said output means further include delay means connected between the output of an AND logic gate and one of said flipflop circuits to reset said flipflop circuit.

11. A storage system comprising an information storage member having information stored thereon in discrete areas by more than two different levels of opacity, means for projecting a beam of light against said member, a photosensitive device for receiving said light transmitted through said member, a plurality of output devices connected to said photosensitive device, and means connected to each of said output devices for establishing a distinct threshold value of operation for each device corresponding to each of said different levels of opacity.

12. A storage system in accordance with claim 11 further comprising logic circuit means connected to each of said output devices for converting the simultaneous outputs of said output devices into distinct coded numbers indicative of the distinct levels of opacity of said storage member.

References Cited in the file of this patent

UNITED STATES PATENTS

| | | |
|---|---|---|
| 2,497,042 | Doll | Feb. 7, 1950 |
| 2,659,072 | Coales | Nov. 10, 1953 |